US010289359B2

(12) United States Patent
Shintani

(10) Patent No.: US 10,289,359 B2
(45) Date of Patent: May 14, 2019

(54) IMAGE FORMING APPARATUS

(71) Applicant: KYOCERA Document Solutions Inc., Osaka-shi, Osaka (JP)

(72) Inventor: Yoshihisa Shintani, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/939,679

(22) Filed: Mar. 29, 2018

(65) Prior Publication Data

US 2018/0285040 A1 Oct. 4, 2018

(30) Foreign Application Priority Data

Mar. 30, 2017 (JP) ................................ 2017-069062

(51) Int. Cl.
*G06F 3/12* (2006.01)
*H04N 1/00* (2006.01)
*H04N 1/44* (2006.01)
*G03G 15/00* (2006.01)

(52) U.S. Cl.
CPC ....... *G06F 3/1222* (2013.01); *G03G 15/5016* (2013.01); *G03G 15/5087* (2013.01); *G06F 3/1207* (2013.01); *G06F 3/1238* (2013.01); *G06F 3/1259* (2013.01); *H04N 1/00076* (2013.01); *H04N 1/00488* (2013.01); *H04N 1/44* (2013.01); *G03G 15/5075* (2013.01); *G03G 2215/00299* (2013.01)

(58) Field of Classification Search
CPC .............. G06F 3/1222; G03G 15/5075; G03G 2215/00299; H04N 1/00076; H04N 1/00488; H04N 1/44
See application file for complete search history.

(56) References Cited

U.S. PATENT DOCUMENTS 6,943,907 B1 * 9/2005 Kim ..................... G03G 15/502
358/1.13

FOREIGN PATENT DOCUMENTS

JP 2000198249 A 7/2000

* cited by examiner

*Primary Examiner* — Moustapha Diaby
(74) *Attorney, Agent, or Firm* — Alleman Hall Creasman & Tuttle LLP

(57) ABSTRACT

An image forming apparatus includes a determination processing portion and a special operation sound generating portion. The determination processing portion determines whether or not image data received from an external apparatus is confidential data. When the determination processing portion determines that the image data received from the external apparatus is the confidential data, the special operation sound generating portion executes a process of generating a special operation sound that is different from an operation sound that occurs when the image data is other than the confidential data.

3 Claims, 5 Drawing Sheets

FIG. 3

CONFIDENTIAL LEVEL TABLE

| CONFIDENTIAL LEVEL | SEARCH PLACE | | SEARCH KEYWORD |
|---|---|---|---|
| 1 | BODY | A | INSIDE INFORMATION |
| 2 | BODY | B | EXCLUSIVE CORPORATE INFORMATION |
| 3 | BODY | C | SECRET |
| 4 | BODY | D | TOP SECRET, TOPSECRET |
| 5 | HEADER | E | INSIDE INFORMATION, EXCLUSIVE CORPORATE INFORMATION, CONFIDENTIAL, SECRET, PRINT PROHIBITED |

FIG. 4

OPERATION SOUND TABLE

| CONFIDENTIAL LEVEL | OPERATION SOUND |
|---|---|
| 1 | EARLY TONER SUPPLY SOUND |
| 2 | IRREGULAR MOTOR SOUND |
| 3 | CONTINUOUS MOTOR SOUND |
| 4 | HIGH-SPEED MOTOR SOUND |
| 5 | AMPLIFIED OPERATION SOUND |

IMAGE FORMING APPARATUS

INCORPORATION BY REFERENCE

This application is based upon and claims the benefit of priority from the corresponding Japanese Patent Application No. 2017-069062 filed on Mar. 30, 2017, the entire contents of which are incorporated herein by reference.

BACKGROUND

The present disclosure relates to an image forming apparatus.

Some image forming apparatuses have a function to form an image on a sheet based on image data transmitted from an external apparatus such as a personal computer. In this type of image forming apparatuses, there is known an image forming apparatus configured to receive a request for a secret printing from an external apparatus. For example, to execute the secret printing, the user sets the secret printing in the print setting performed on the external apparatus before the image data is transmitted to the image forming apparatus. In addition, after setting the secret printing and transmitting the image data to the image forming apparatus, the user performs an operation to execute the secret printing and start the secret printing on the image forming apparatus.

SUMMARY

An image forming apparatus according to an aspect of the present disclosure includes a determination processing portion and a special operation sound generating portion. The determination processing portion determines whether or not image data received from an external apparatus is confidential data. When the determination processing portion determines that the image data received from the external apparatus is the confidential data, the special operation sound generating portion executes a process of generating a special operation sound that is different from an operation sound that occurs when the image data is other than the confidential data.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 shows an example of a confidential level table stored in a storage portion of the image forming apparatus of FIG. 1.

FIG. 4 shows an example of an operation sound table stored in the storage portion of the image forming apparatus of FIG. 1.

DETAILED DESCRIPTION

The following describes an embodiment of the present disclosure with reference to the accompanying drawings. It should be noted that the following embodiment is an example of a specific embodiment of the present disclosure and can be modified as necessary in a range where the gist of the present disclosure is not changed.

Figure 1:
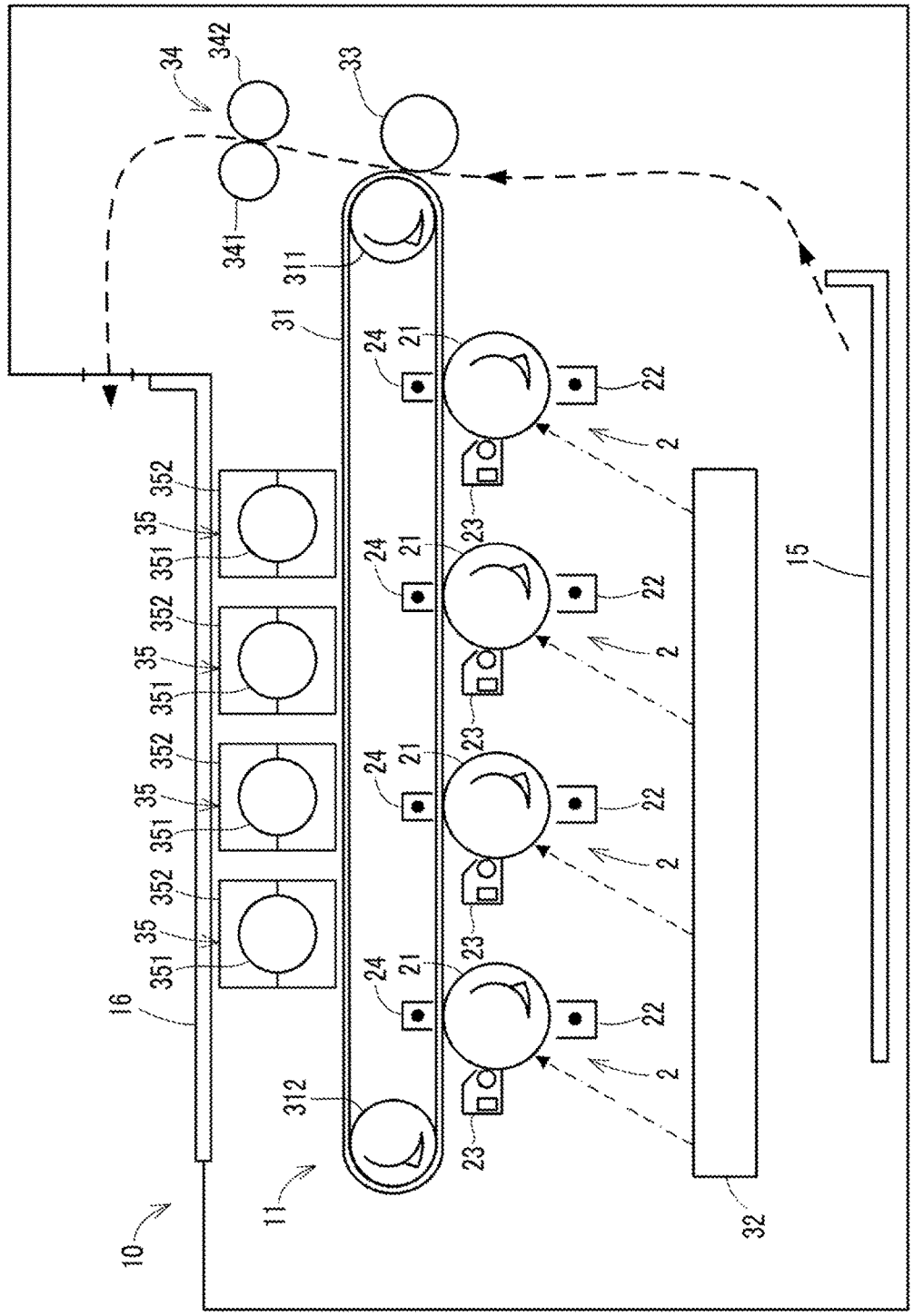
FIG. 1 is a cross-sectional diagram schematically showing an image forming apparatus according to an embodiment of the present disclosure.
Figure 2:
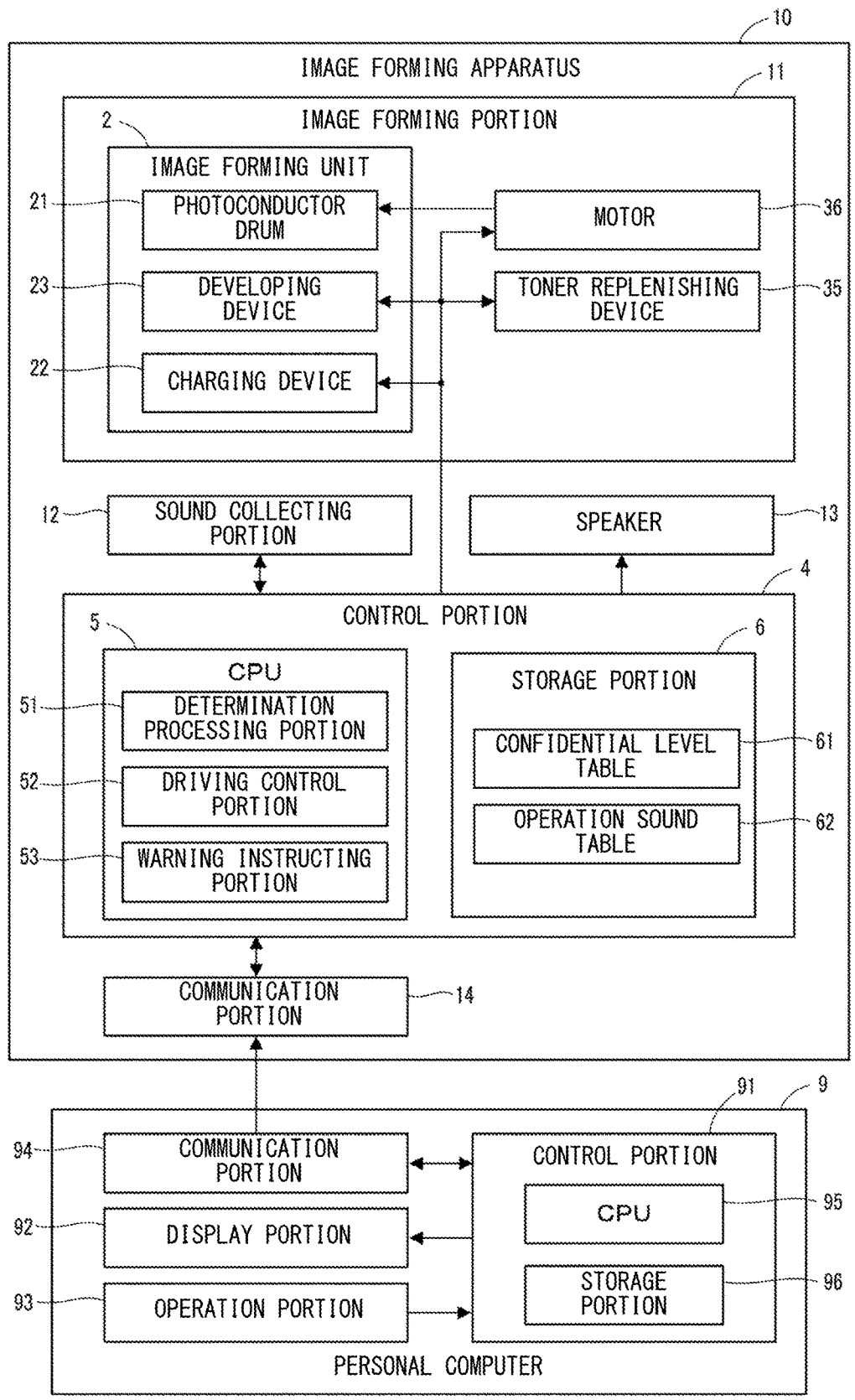
FIG. 2 is a block diagram showing the image forming apparatus of FIG. 1 and a personal computer.

An image forming apparatus 10 shown in FIG. 1 and FIG. 2 is a printer that can form a color image on a sheet by an electrophotographic system by using developer including toner. It is noted that the present disclosure is applicable to, for example, a monochrome printer, a copier, a facsimile, and a multifunction peripheral, as well as a color printer.

The image forming apparatus 10 includes an image forming portion 11, a sound collecting portion 12, a speaker 13, a communication portion 14, and a control portion 4.

The image forming portion 11 forms an image on a sheet. The image forming portion 11 includes a plurality of image forming units 2, an intermediate transfer belt 31, an exposure device 32, a secondary transfer roller 33, a fixing device 34, a plurality of toner replenishing devices 35 (an example of the toner replenishing portion of the present disclosure), and a motor 36.

Each of the image forming units 2 includes a photoconductor drum 21 (an example of the image carrier of the present disclosure) configured to carry a toner image, a charging device 22 (an example of the charging portion of the present disclosure) configured to charge an outer circumferential surface of the photoconductor drum 21, a developing device 23 (an example of the developing portion of the present disclosure) configured to form the toner image on the photoconductor drum 21, and a primary transfer device 24.

The intermediate transfer belt 31 carries a color toner image formed from toner images of a plurality of colors (in the present embodiment, four colors). The intermediate transfer belt 31 is supported by a driving roller 311 and a driven roller 312 in such a way as to be rotationally driven by the driving roller 311 and the driven roller 312. The intermediate transfer belt 31 is configured to move while its surface is in contact with surfaces of the photoconductor drums 21.

The secondary transfer roller 33 transfers the toner image transferred to the intermediate transfer belt 31, to a sheet conveyed from a sheet feed tray 15. The sheet with the toner image transferred thereto is conveyed to the fixing device 34 by a conveyance portion (not shown). The fixing device 34 conveys the sheet with the toner image transferred thereto, while adding heat and pressure thereto. This allows the toner image to be fused and fixed to the sheet. The sheet with the toner image fixed thereto is further conveyed to the downstream side, and is ejected onto a sheet discharge tray 16 that is disposed above the intermediate transfer belt 31.

The plurality of toner replenishing devices 35 are provided above the intermediate transfer belt 31. In the present embodiment, four toner replenishing devices 35 are provided in correspondence with colors of black, yellow, cyan, and magenta, respectively. The four toner replenishing devices 35 have the same configuration. Each of the toner replenishing devices 35 includes a toner container 351 and a toner container attachment portion 352. The toner container 351 stores toner that is supplied to the developing device 23. The toner container 351 is inserted in the toner container attachment portion 352 toward a predetermined attachment position, and attached to the attachment position.

The motor 36 applies a rotational force to the photoconductor drum 21. The motor 36 is controlled by a drive control portion 52 of the control portion 4 that is described below.

The sound collecting portion 12 collects operation sounds that occurs when the image forming portion 11 forms an image on a sheet. The operation sounds include, for example, a driving sound of the motor 36, and a toner supply sound that occurs when the toner replenishing devices 35 supply toner to the developing device 23. The speaker 13 amplifies the operation sound collected by the sound collecting portion 12 and outputs the amplified sound.

The communication portion 14 is an interface for performing a data communication with a personal computer 9 (an example of the external apparatus of the present disclosure). The communication portion 14 performs a data communication with the personal computer 9 via a communication network such as a LAN or a WAN.

The personal computer 9 includes a control portion 91, a display portion 92, an operation portion 93, and a communication portion 94. The control portion 91 includes a CPU 95 and a storage portion 96, wherein the CPU 95 is configured to control various operations of the personal computer 9, and the storage portion 96 stores image data that is transmitted to the image forming apparatus 10. The storage portion 96 is, for example, a ROM or a RAM. The display portion 92 displays various types of information such as a warning received from the image forming apparatus 10 when image data transmitted to the image forming apparatus 10 is confidential data with a predetermined level. The display portion 92 is, for example, a liquid crystal display. The operation portion 93 is operated by a user in a case where, for example, image data stored in the storage portion 96 is to be transmitted to the image forming apparatus 10. The operation portion 93 is, for example, a keyboard, a mouse, or a touch panel. The communication portion 94 is an interface for performing a data communication with the image forming apparatus 10.

The control portion 4 controls operations of the components of the image forming portion 11 including the toner replenishing devices 35 and the motor 36, and operations of the sound collecting portion 12, the speaker 13 and the like. The control portion 4 includes a CPU 5 and a storage portion 6.

The CPU 5 includes a determination processing portion 51, a driving control portion 52, and a warning instructing portion 53.

The determination processing portion 51 determines whether or not image data received from the personal computer 9 via the communication portion 14 is confidential data. In addition, the determination processing portion 51 is configured to, in a case where a plurality of confidential levels have been set, determine a confidential level from among the plurality of confidential levels. Specifically, the determination processing portion 51 determines whether or not image data is confidential data depending on whether or not a search keyword registered in advance by the user is included in the header or the body of the image data, and upon determining that the image data is confidential data, the determination processing portion 51 determines the confidential level. In the present embodiment, search keywords are registered by the user in a confidential level table 61 (see FIG. 3) that is described below, each in association with a confidential level and a search place in the image data. The confidential level table 61 is stored in the storage portion 6.

The driving control portion 52 controls the image forming operation executed by the image forming portion 11. In addition, when the determination processing portion 51 determines that image data received from the personal computer 9 is confidential data, the driving control portion 52 executes a process of generating a special operation sound that is different from an operation sound that occurs when the image data is other than confidential data. Specifically, the driving control portion 52 controls the operation sound generated by the image forming portion 11, by controlling the driving of the image forming portion 11, the sound collecting portion 12, and the speaker 13. On the other hand, when the determination processing portion 51 determines that image data received from the personal computer 9 is not confidential data, the driving control portion 52 performs a normal printing. In the following description, an operation sound that occurs during the normal printing is referred to as a normal operation sound. It is noted that the driving control portion 52 is an example of the special operation sound generating portion of the present disclosure.

In the present embodiment, the special operation sound includes a toner pre-supply sound, an irregular motor sound, a continuous motor sound, a high-speed motor sound, and an amplified operation sound (see FIG. 4). It is noted that the toner pre-supply sound, the irregular motor sound, and the continuous motor sound are an example of the first special operation sound of the present disclosure. In addition, the high-speed motor sound and the amplified operation sound are an example of the second special operation sound of the present disclosure which is louder than the first special operation sound.

The toner pre-supply sound is generated when the driving control portion 52, during a first period, controls the driving of the toner replenishing device 35 in such a way as to supply toner to the developing device 23. The first period is from a predetermined first standard time point to when the charging device 22 starts to charge the photoconductor drum 21. The first standard time point is, for example, 30 to 180 seconds before the time point when the charging device 22 starts to charge the photoconductor drum 21.

The irregular motor sound is generated when the driving control portion 52, during a second period, controls the driving of the motor 36 in such a way as to rotate the photoconductor drum 21 irregularly. The second period is from a predetermined second standard time point to when the charging device 22 starts to charge the photoconductor drum 21. The second standard time point is, for example, the same as the first standard time point. Rotating the photoconductor drum 21 irregularly includes repeatedly stopping and rotating the photoconductor drum 21 at regular or irregular intervals, and repeatedly accelerating and decelerating the rotation speed of the photoconductor drum 21 at regular or irregular intervals.

The continuous motor sound is generated when the driving control portion 52, during a third period, continues the rotation of the motor 36. The third period is from a completion time point when an image forming operation of forming an image based on image data from the personal computer 9 is completed, to a predetermined third standard time point. The third standard time point is a time point when a printed sheet is taken out from the sheet discharge tray 16, or a time point when 30 to 180 seconds have elapsed since the completion time point.

The high-speed motor sound is generated when, during a fourth period or a fifth period, the rotation speed of the motor 36 is made higher than during the normal printing. The fourth period is from a predetermined fourth standard time point to when the charging device 22 starts to charge the photoconductor drum 21. The fourth standard time point is, for example, the same as the first standard time point. The fifth period is from when an image forming operation of forming an image based on image data is completed, to a predetermined fifth standard time point. The fifth standard time point is, for example, the same as the third standard time point.

The amplified operation sound is generated when an amplified sound of the normal operation sound of the image forming portion 11 collected by the sound collecting portion 12, is output from the speaker 13.

Meanwhile, if image data transmitted from an external apparatus to an image forming apparatus is confidential data, and the confidential data is printed on the image forming apparatus by a secret printing set by the user, people around the image forming apparatus cannot recognize that the confidential data is printed in an unauthorized manner. As a result, the image forming apparatus is required to have a suppression force against printing of confidential data. In connection with this problem, when confidential data is printed on the image forming apparatus 10 according to the present embodiment, a special operation sound different from the normal operation sound is generated. With this configuration, even when the secret printing is performed, people around the image forming apparatus can recognize that the confidential data is printed in an unauthorized manner. In other words, people around the image forming apparatus can recognize, from the special operation sound, that the confidential data is printed in an unauthorized manner. Accordingly, generating the special operation sound becomes a suppression force, and it persuades the suspicious user not to print the confidential data. That is, it is possible to prevent printing of confidential data.

The toner pre-supply sound, the irregular motor sound, the continuous motor sound, and the high-speed motor sound are generated to continue to the normal operation sound before or after an image forming operation is performed. On the other hand, the high-speed motor sound and the amplified operation sound are louder than the normal operation sound. That is, when confidential data is printed on the image forming apparatus 10, a long or loud operation sound is output compared to when the normal data is printed. This makes it easier for the people around the image forming apparatus 10 to recognize, from the special operation sound output from the image forming apparatus 10, that the confidential data is printed in an unauthorized manner.

The warning instructing portion 53 is configured to, in a case where printing of image data with high confidential level is requested from the personal computer 9, transmits, via the communication portion 14, an instruction for the personal computer 9 to display a warning on the display portion 92 of the personal computer 9.

The storage portion 6 stores various types of information such as a program for controlling the operation of the image forming portion 11. In addition, the storage portion 6 stores the confidential level table 61 and an operation sound table 62.

As shown in FIG. 3, in the confidential level table 61, confidential levels, search places in the image data, and search keywords are associated with each other based on the user setting. That is, the confidential level table 61 can be updated by the user. For example, when the determination processing portion 51 is to determine whether or not the image data is confidential data, the determination processing portion 51 refers to the confidential level table 61 to determine the confidential level of the confidential data. Here, the confidential level represents the level of confidentiality, and the higher the value is, the higher the confidential level is. In the present embodiment, five levels 1 to 5 are set as the confidential levels. The search place means a place in the image data that is searched for the search keyword. In the present embodiment, the header or the body of the image data can be specified as the search place. The search keyword is registered by the user, and an arbitrary character sequence can be registered as the search keyword. It is noted that the confidential data with any of confidential levels 1 to 3 is an example of the first confidential data of the present disclosure, and the confidential data with any of confidential levels 4 and 5 is an example of the second confidential data of the present disclosure.

The determination processing portion 51 is configured to distinguish among the confidential levels 1 to 5 and determine one from among them. When the determination processing portion 51 determines that the image data is confidential data with one of the confidential levels 1 to 3 (the first confidential data), the driving control portion 52 executes a process of generating the toner pre-supply sound, the irregular motor sound, or the continuous motor sound (the first special operation sound) depending on the determined confidential level. On the other hand, when the determination processing portion 51 determines that the image data is confidential data with one of the confidential levels 4 and 5 (the second confidential data), the driving control portion 52 executes a process of generating the high-speed motor sound or the amplified operation sound (the second special operation sound) depending on the determined confidential level.

As shown in FIG. 4, in the operation sound table 62, confidential levels and operation sounds are associated with each other. The operation sound table 62 is referred to when, for example, the driving control portion 52 generates a special operation sound. In the present embodiment, the confidential level 1 is associated with the toner pre-supply sound. The confidential level 2 is associated with the irregular motor sound. The confidential level 3 is associated with the continuous motor sound. The confidential level 4 is associated with the high-speed motor sound. The confidential level 5 is associated with the amplified operation sound. It is noted that the relationship between the confidential levels and the operation sounds may be set by the user.

In the following, an operation sound control process executed by the CPU 5 is described with reference to the flowchart of FIG. 5. It is noted that in the drawing, steps S1, S2, . . . represent numbers of the processing procedures (steps). In addition, the steps are executed by the determination processing portion 51, the driving control portion 52, the warning instructing portion 53 and the like of the CPU 5 of the control portion 4.

<Step S1>

Figure 5:
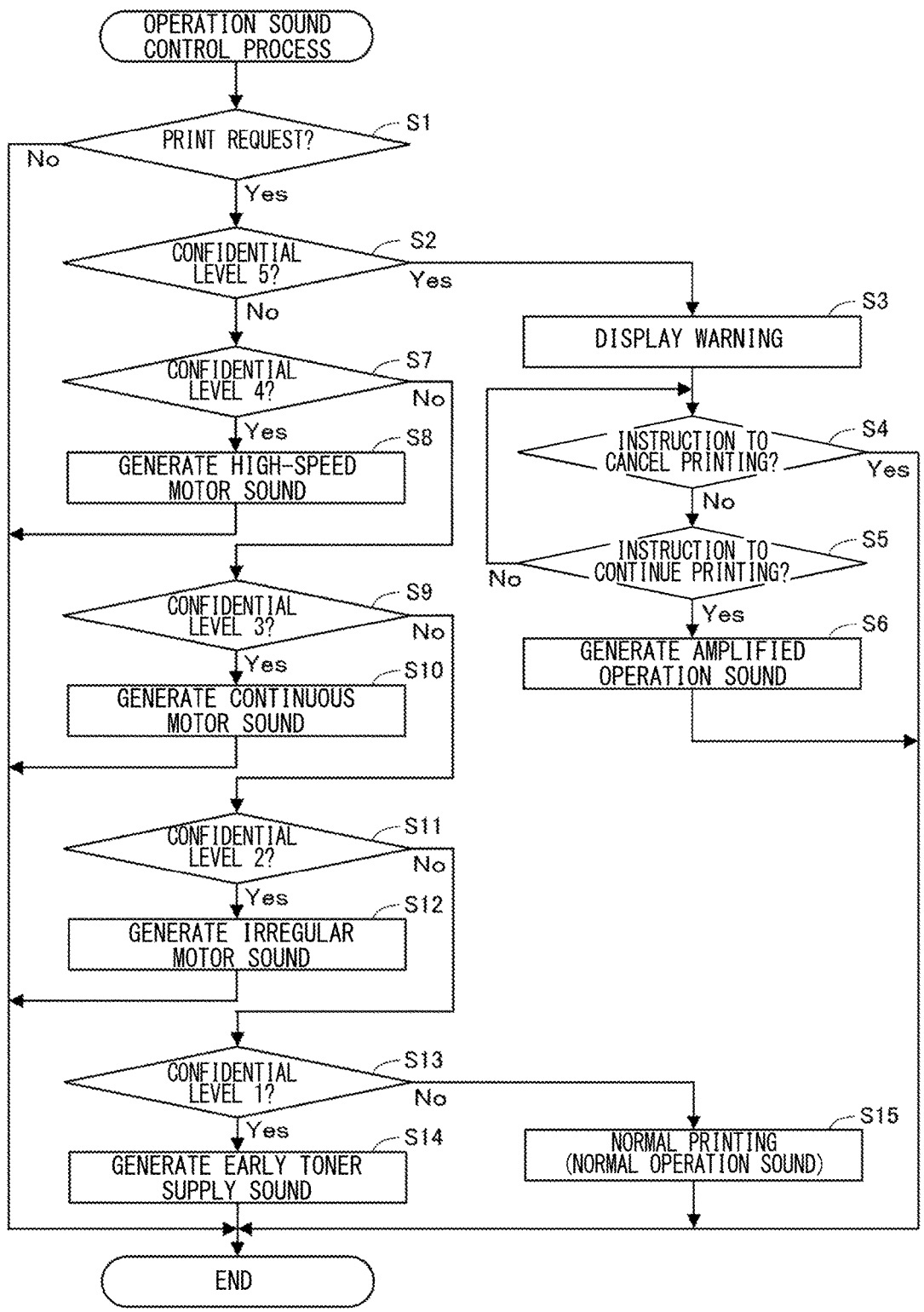
FIG. 5 is a flowchart showing an example of procedures of an operation sound control process executed by a control portion of the image forming apparatus of FIG. 2.

As shown in FIG. 5, in step S1, the CPU 5 determines whether or not a print request has been received from the personal computer 9. Upon determining that a print request has been received (step S1: Yes), the CPU 5 moves the process to step S2. On the other hand, upon determining that a print request has not been received (step S1: No), the CPU 5 ends the operation sound control process.

<Step S2>

In step S2, the CPU 5 determines whether or not the image data received from the personal computer 9 is confidential data with confidential level 5. Specifically, the CPU 5 determines whether or not a search keyword E (see FIG. 3) is included in the character sequence in the header that specifies a title, a creator, a keyword, an explanation, an identifier and the like of the image data.

Upon determining that the image data is confidential data with confidential level 5 (step S2: Yes), the CPU 5 moves the process to step S3. On the other hand, upon determining that the image data is not confidential data with confidential level 5 (step S2: No), the CPU 5 moves the process to step S7.

<Step S3>

In a case where the image data is confidential data with confidential level 5 (step S2: Yes), in step S3, the CPU 5 transmits a warning to the personal computer 9. On the other hand, upon receiving the warning, the personal computer 9 displays, on the display portion 92, a message urging the user to indicate whether to continue the printing. At this time, the display portion 92 displays, for example, a message "There is a possibility that unauthorized data is included. An operation sound that is louder than normal is output", as well.

<Steps S4 and S5>

When the warning is transmitted in step S3, in step S4, the CPU 5 determines whether or not an instruction to cancel the print job has been received from the personal computer 9. Upon determining that an instruction to cancel the print job has been received (step S4: Yes), the CPU 5 ends the operation sound control process. On the other hand, upon determining that an instruction to cancel the print job has not been received (step S4: No), in step S5, the CPU 5 determines whether or not an instruction to continue the print job has been received from the personal computer 9.

Upon determining that an instruction to continue the print job has been received (step S5: Yes), the CPU 5 moves the process to step S6. On the other hand, upon determining that an instruction to continue the print job has not been received (step S5: No), the CPU 5 repeatedly executes the processes of steps S4 and S5 until an instruction to cancel the print job is received (step S4: Yes) or an instruction to continue the print job is received (step S5: Yes).

<Step S6>

Upon determining that an instruction to continue the print job has been received (step S5: Yes), in step S6, the CPU 5 generates the amplified operation sound and ends the operation sound control process. Specifically, the CPU 5 activates the sound collecting portion 12 and causes it to collect the operation sound of the image forming portion 11. In addition, the CPU 5 amplifies the operation sound collected by the sound collecting portion 12 and outputs the amplified sound from the speaker 13.

<Step S7>

In step S7, the CPU 5 determines whether or not the image data received from the personal computer 9 is confidential data with confidential level 4. Specifically, the CPU 5 determines whether or not a search keyword D (see FIG. 3) is included in the body of the image data.

Upon determining that the image data is confidential data with confidential level 4 (step S7: Yes), the CPU 5 moves the process to step S8. On the other hand, upon determining that the image data is not confidential data with confidential level 4 (step S7: No), the CPU 5 moves the process to step S9.

<Step S8>

In a case where the image data is confidential data with confidential level 4 (step S7: Yes), in step S8, the CPU 5 generates the high-speed motor sound and ends the operation sound control process. Specifically, the CPU 5 drives the motor 36 at a higher speed than in the normal printing during the fourth period before the image forming operation is performed. It is noted that the high-speed motor sound may be generated during the fifth period after the image forming operation is performed, or may be generated during both the fourth period and the fifth period.

<Step S9>

In step S9, the CPU 5 determines whether or not the image data received from the personal computer 9 is confidential data with confidential level 3. Specifically, the CPU 5 determines whether or not a search keyword C (see FIG. 3) is included in the body of the image data.

Upon determining that the image data is confidential data with confidential level 3 (step S9: Yes), the CPU 5 moves the process to step S10. On the other hand, upon determining that the image data is not confidential data with confidential level 3 (step S9: No), the CPU 5 moves the process to step S11.

<Step S10>

In a case where the image data is confidential data with confidential level 3 (step S9: Yes), in step S10, the CPU 5 generates the continuous motor sound and ends the operation sound control process. Specifically, the CPU 5 performs a control to continue the driving of the motor 36 during the third period after the image forming operation is performed.

<Step S11>

In step S11, the CPU 5 determines whether or not the image data received from the personal computer 9 is confidential data with confidential level 2. Specifically, the CPU 5 determines whether or not a search keyword B (see FIG. 3) is included in the body of the image data.

Upon determining that the image data is confidential data with confidential level 2 (step S11: Yes), the CPU 5 moves the process to step S12. On the other hand, upon determining that the image data is not confidential data with confidential level 2 (step S11: No), the CPU 5 moves the process to step S13.

<Step S12>

In a case where the image data is confidential data with confidential level 2 (step S11: Yes), in step S12, the CPU 5 generates the irregular motor sound and ends the operation sound control process. Specifically, the CPU 5 performs a driving control to cause the motor 36 to rotate irregularly during the second period before the image forming operation is performed.

<Step S13>

In step S13, the CPU 5 determines whether or not the image data received from the personal computer 9 is confidential data with confidential level 1. Specifically, the CPU 5 determines whether or not a search keyword A (see FIG. 3) is included in the body of the image data.

Upon determining that the image data is confidential data with confidential level 1 (step S13: Yes), the CPU 5 moves the process to step S14. On the other hand, upon determining that the image data is not confidential data with confidential level 1 (step S13: No), the CPU 5 moves the process to step S15.

<Step S14>

In a case where the image data is confidential data with confidential level 1 (step S13: Yes), in step S14, the CPU 5 generates the toner pre-supply sound and ends the operation sound control process. Specifically, the CPU 5 performs a driving control to cause the toner replenishing device 35 to replenish the toner to the developing device 23 during the first period.

<Step S15>

In step S15, the CPU 5 performs a driving control to cause the image forming portion 11 to perform the normal printing. That is, in a case where the image data received from the personal computer 9 is not any of the confidential levels 1 to 5, the CPU 5 determines that the image data is not confidential data and executes the normal printing.

In the above-described embodiment, five levels 1 to 5 are set as the confidential levels of the confidential data. However, the confidential levels are not limited to five levels. The confidential levels may not necessarily be assigned to the confidential data for the classification thereof.

In addition, the driving control portion 52 may execute a process of generating the same operation sound for different confidential levels. Furthermore, in a case where a plurality of special operation sounds different from the normal operation sound are generated, the driving control portion 52 may execute a process of generating a combination of two or more special operation sounds before the normal operation sound, and execute a process of generating the continuous operation sound after the normal operation sound.

In addition, the driving control portion 52 may execute the operation sound control process on the condition that, in addition to the print request, the secret printing is performed in accordance with a print setting made by the user on an external apparatus such as the personal computer 9.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
   a determination processing portion configured to determine whether or not image data received from an external apparatus is confidential data; and
   a special operation sound generating portion configured to, when the determination processing portion determines that the image data received from the external apparatus is the confidential data, execute a process of generating a special operation sound that is different from an operation sound that occurs when the image data is other than the confidential data, wherein
   the confidential data includes first confidential data and second confidential data that has a higher confidential level than the first confidential data,
   the special operation sound includes a first special operation sound and a second special operation sound that is different from the first special operation sound,
   the determination processing portion is configured to determine whether the image data is the first confidential data or the second confidential data,
   the special operation sound generating portion
   executes a process of generating the first special operation sound when the determination processing portion determines that the image data is the first confidential data, and
   executes a process of generating the second special operation sound when the determination processing portion determines that the image data is the second confidential data.

2. The image forming apparatus according to claim 1, wherein
   the second special operation sound is louder than the first special operation sound.

3. An image forming apparatus comprising:
   a determination processing portion configured to determine whether or not image data received from an external apparatus is confidential data; and
   a special operation sound generating portion configured to, when the determination processing portion determines that the image data received from the external apparatus is the confidential data, execute a process of generating a special operation sound that is different from an operation sound that occurs when the image data is other than the confidential data;
   an image carrier;
   a motor configured to rotationally drive the image carrier;
   a charging portion configured to charge an outer circumferential surface of the image carrier;
   a developing portion configured to form a toner image on the image carrier; and
   a toner replenishing portion configured to replenish toner to the developing portion, wherein
   the special operation sound includes any of
   a toner pre-supply sound that is generated when the toner replenishing portion supplies the toner to the developing portion during a first period which is from a predetermined first standard time point to when the charging portion starts to charge the image carrier,
   an irregular motor sound that is generated when the motor is caused to rotate the image carrier irregularly during a second period which is from a predetermined second standard time point to when the charging portion starts to charge the image carrier,
   a continuous motor sound that is generated when a rotation of the image carrier made by the motor is continued during a third period which is from a time point when an image forming operation of forming an image based on image data is completed, to a predetermined third standard time point, and
   a high-speed motor sound that is generated when, during a fourth period or a fifth period, a rotation speed of the motor is made higher than during the image forming operation, the fourth period being from a predetermined fourth standard time point to when the charging portion starts to charge the image carrier, the fifth period being from when the image forming operation is completed, to a predetermined fifth standard time point.

\* \* \* \* \*